(12) United States Patent
Kortum

(10) Patent No.: US 7,325,988 B2
(45) Date of Patent: Feb. 5, 2008

(54) ONE-PIECE ERGONOMIC KEYBOARD AND RELATED METHODS

(75) Inventor: Philip T. Kortum, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 10/878,540

(22) Filed: Jun. 29, 2004

(65) Prior Publication Data

US 2005/0286961 A1 Dec. 29, 2005

(51) Int. Cl.
*G06F 1/00* (2006.01)

(52) U.S. Cl. ............ 400/490; 400/489; 400/495; 400/715; 248/118; 361/680

(58) Field of Classification Search .......... 400/473, 400/480, 486, 489, 490, 491.1, 495, 491.2, 400/715; 248/118; 361/680
See application file for complete search history.

(56) References Cited

U.S. PATENT DOCUMENTS

| | | | |
|---|---|---|---|
| 5,220,521 A | | 6/1993 | Kikinis |
| 5,595,449 A | * | 1/1997 | Vitkin ................ 400/472 |
| 5,742,241 A | * | 4/1998 | Crowley et al. ........ 341/22 |
| 5,748,114 A | | 5/1998 | Koehn |
| 6,052,071 A | | 4/2000 | Crowley et al. |
| 6,178,619 B1 | | 1/2001 | Tai |
| 6,216,988 B1 | * | 4/2001 | Hsu et al. ............ 248/118 |
| 6,313,762 B1 | | 11/2001 | Crowley et al. |
| 6,452,791 B2 | * | 9/2002 | Kim .................. 361/683 |
| 6,903,924 B1 | * | 6/2005 | Tyner ................ 361/680 |
| 2003/0044216 A1 | | 3/2003 | Fang |
| 2005/0105951 A1 | * | 5/2005 | Risheq ............... 400/472 |

OTHER PUBLICATIONS

Chord Keyboard, IBM Technical Disclosure Bulletin, Dec. 1982, http://www.delphion.com/tdbs/tdb?order=92A+61863, 2 pages.
Carpal Tunnel Syndrome—Re: Ergonomic Keyless Keyboard—Feb. 28, 2004, http://www.ctsplace.com/ctsboard/messages/19419.php, 2 pages.
Flexible Keyboards—http://www.flexboards.com—Copyright 2000-2004, 4 pages.
Flexible Keyboard—www.Infogrip.com catalog, p. 13, date unknown.
Silicone Washable Keyboard, Copyright 1997-2002,http://www.2opinion.com/accessories/flexkey.htm, 2 pages.

* cited by examiner

*Primary Examiner*—Daniel J. Colilla
*Assistant Examiner*—Kevin D. Williams
(74) *Attorney, Agent, or Firm*—Hanley, Flight & Zimmerman, LLC

(57) ABSTRACT

A one-piece keyboard includes a compressible body having a plurality of depressible key areas, each associated with a first spring constant, and a wrist support area of the body associated with a second spring constant. By selecting appropriate spring constants, stresses on a user's fingers, hands and wrists may be reduced.

14 Claims, 2 Drawing Sheets

ONE-PIECE ERGONOMIC KEYBOARD AND RELATED METHODS

BACKGROUND OF THE INVENTION

A variety of ergonomic keyboards have been developed for use with a computer. Ergonomic guidelines frequently suggest providing a support to the wrist of a person using the keyboard and minimizing the amount of finger force needed to depress keys located on the top surface of the keyboard in order to reduce stress-related injuries to the wrist and fingers of the user. Unfortunately, though attempts have been made to develop such an ergonomic keyboard, these attempts have fallen short of the mark because their designs are either inherently incapable of significantly reducing stresses to the wrists and fingers, involve complicated mechanical or magnetic configurations or cost too much.

SUMMARY OF THE INVENTION

We have recognized that it is possible to provide a keyboard that is both economically viable and ergonomically superior to existing keyboards if such as keyboard is formed from a compressible material (e.g., foam). Such a material may have associated with it one or more spring constants which may be varied by varying the thickness, density and/or composition of portions of the keyboard to meet various stress reduction criteria.

The keyboard may be made as a one-piece keyboard, having a body portion which includes a wrist support area and a plurality of depressible, key areas (i.e., a keypad). The key areas and wrist support area may be associated with substantially the same, or different, spring constants in order to provide desirable finger forces sufficient to depress a key area without placing undue stress on the fingers and to provide a desirable amount of wrist support.

The keyboard provided by the present invention may also include a sensory feedback section which is selectively operable to output a signal in response to a force placed on one or more of the key areas. For example, a user may choose to disable the sensory feedback section such that the depression of a key area causes little, or no noise, or, a user may choose to enable the sensory feedback section so that when a key area is depressed an audible signal, for example, is output. This audible signal may have a tone similar to the sound made by conventional keystrokes.

DETAILED DESCRIPTION OF EMBODIMENTS

Figure 1:
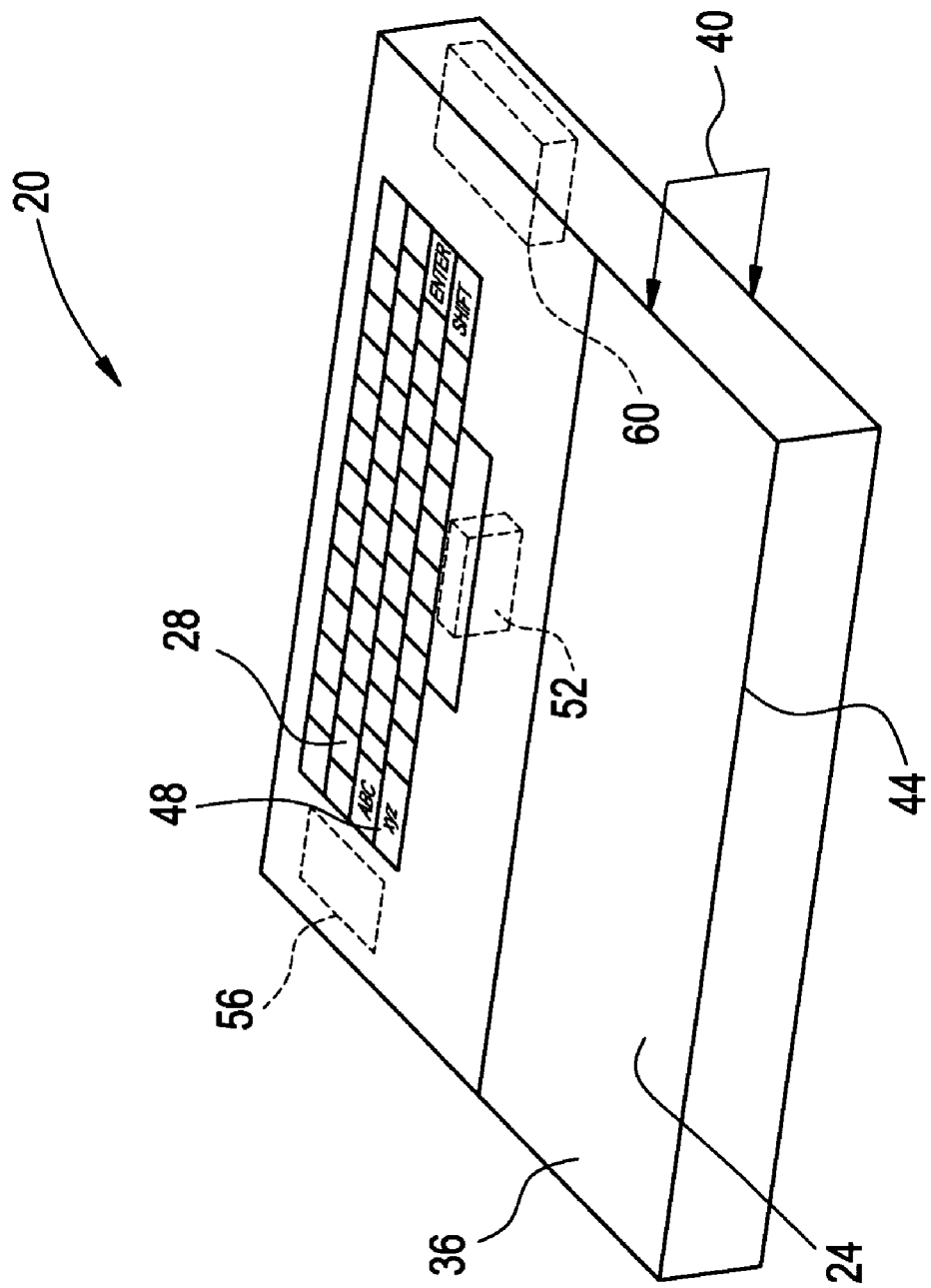
FIG. 1 is a perspective view of a keyboard in accordance with one embodiment of the present invention.

Referring now to FIG. 1, there is shown one example of a keyboard 20 provided by the present invention. The keyboard 20 may comprise a one-piece compressible body 24 including a plurality of depressible key areas forming a keypad 28. The body 24 may be fabricated from a single piece of compressible material, e.g., a material selected from the group consisting of a compressible foam-like material, synthetic rubber or rubber-like material. The body 24 also includes an integral wrist support area 36. The keyboard 20 and particularly the wrist support area 36, are sufficiently large in size so that a user can rest one or both hands in a natural position on the keyboard 20 and/or wrist support area 36.

A spring constant associated with the body 24 making up the key areas 28 determines a force needed to register a keystroke using one of the key areas 28 as further described below. The body 24 making up the wrist support area 36 also has an associated spring constant. In a configuration in which the keyboard 20 is fabricated from a single piece of compressible material having a substantially constant density therethrough, the spring constant associated with the key areas 28 and the wrist support area 36 may be substantially the same.

Configurations also are contemplated in which more than one piece of compressible material is used to eventually fabricate a one-piece keyboard, like keyboard 20. For example, the one-piece body 24 may be fabricated by combining, joining or otherwise connecting two or more pieces of the same compressible material or pieces made from different compressible materials using techniques known in the art, each piece having a different density (and different spring constant) than the other to form a single body 24. In one such embodiment, the key areas 28 may be fabricated from a material having a first spring constant that facilitates a desired key or finger force, while the wrist support area may be fabricated from a material having a second or different spring constant that facilitates a desired cushioning and/or support effect.

Though normally each of the key areas 28 will be formed from compressible material having a substantially uniform spring constant (i.e., the spring constant associated with each of the key areas 28 is the same), this may not be the case. If desired, one or more of the key areas 28 may be associated with a different spring constant. Practically speaking, this may make the cost of the keyboard 20 prohibitive. More likely, one or more key areas 28 would be grouped together such that the underlying adjacent compressible material may have the same, or a uniform, spring constant.

The keyboard 20 may comprise one or more thicknesses 40. Each thickness is related to the cushioning and/or support effect desired and density of the material(s) used in fabricating the key areas and/or the wrist support area. In one configuration, a compressible proximal edge 44 of the wrist support area 36 may be contoured and/or fabricated from a material having a spring constant appropriate for minimizing pressure to the wrist area(s) and forearm(s) of a user.

Each of the key areas 28 includes a surface on which may be placed a symbol or the like 48. Each symbol 48 may include, for example, a standard keyboard alphanumeric character and/or other character. In one configuration, the symbols 48 may comprise stencils that are screenprinted onto the surface of each key area. Other or additional ways of labeling the key areas 28 are also contemplated, including but not limited to, affixing a printed label to one or more of the key areas 28.

Each key area 28 may be operable to transmit a signal when the area is sufficiently depressed. Such a signal may be generated by a key sensor 52 beneath each key area 28 (one of which is shown in phantom in FIG. 1) placed within the body 20. When a key area 28 is sufficiently depressed, the key sensor 52 corresponding to the depressed key area 28 detects the associated pressure and transmits a signal to, for example, a processor 56 (indicated in phantom) within the keyboard 20. Stored in the processor 56 are programmable key functions, corresponding to the key areas 28. Upon receiving a key depression signal, processor 56 may be operable to generate an output signal corresponding to the function associated with the depressed key area 28. The processor 56 may transmit such signal to a computer (not shown) operable by a user using the keyboard 20. The keyboard 20 may use a wired connection, and/or may include a wireless transmitter, for communicating with such a computer. In another configuration, the processor 56 may be external to the keyboard 20. For example, the processor 56 may be a computer (not shown) operable by a user using the keyboard 20. In yet another embodiment of the present invention, key functions may be reprogrammed or programmed as the case may be, for example, to associate different key areas 28 with different key functions.

The keyboard 20 may also include an optional sensory feedback section 60 (shown in phantom) within the keyboard 20. The feedback section 60 may be connected with the key areas 28, sensors 52 and processor 56 to output signals, such as audible signals, that mimic the sound of a conventional mechanical keyboard. Implemented as such, the feedback section 60 may be an auditory feedback device, for example, a sound card in cooperation with the processor 56. The present invention also provides for configurations where the feedback section 60 provides other or additional kinds of feedback, including but not limited to, visual and/or vibratory feedback. The feedback section 60 may be selectively disabled or enabled by a user. For example, if section 60 comprises an auditory feedback device, a user may choose to disable the device, at least temporarily, in an environment such as a classroom or conference room. In yet other configurations, the sensory feedback section 60 may be included in the processor 56 and/or computer (not shown) operable via the keyboard 20. The present invention also provides for alternative configurations where functions relating to the operation of the sensory feedback section 60 may be stored in a computer and/or computer-readable medium making up, or a part of, the processor 56. The functions may be programmed and/or reprogrammed, for example, to provide a number of different sounds (one at a time, or serially) when a key area 28 is depressed.

When the functions are stored on a computer readable medium (e.g., floppy disk, DVD, CD, microprocessor, digital signal processor, etc.) the sensory feedback section 60 may be controlled (e.g., enabled, disabled) by the medium using stored executable instructions or the like. Similarly, the medium may also store instructions for controlling other elements (and associated functions) of the keyboard 20, such as the key areas 28. For example, the medium may store instructions and data which can be used to associate different functions with one or more of the key areas 28; each function being carried out when a key area 28 is depressed.

Figure 2:
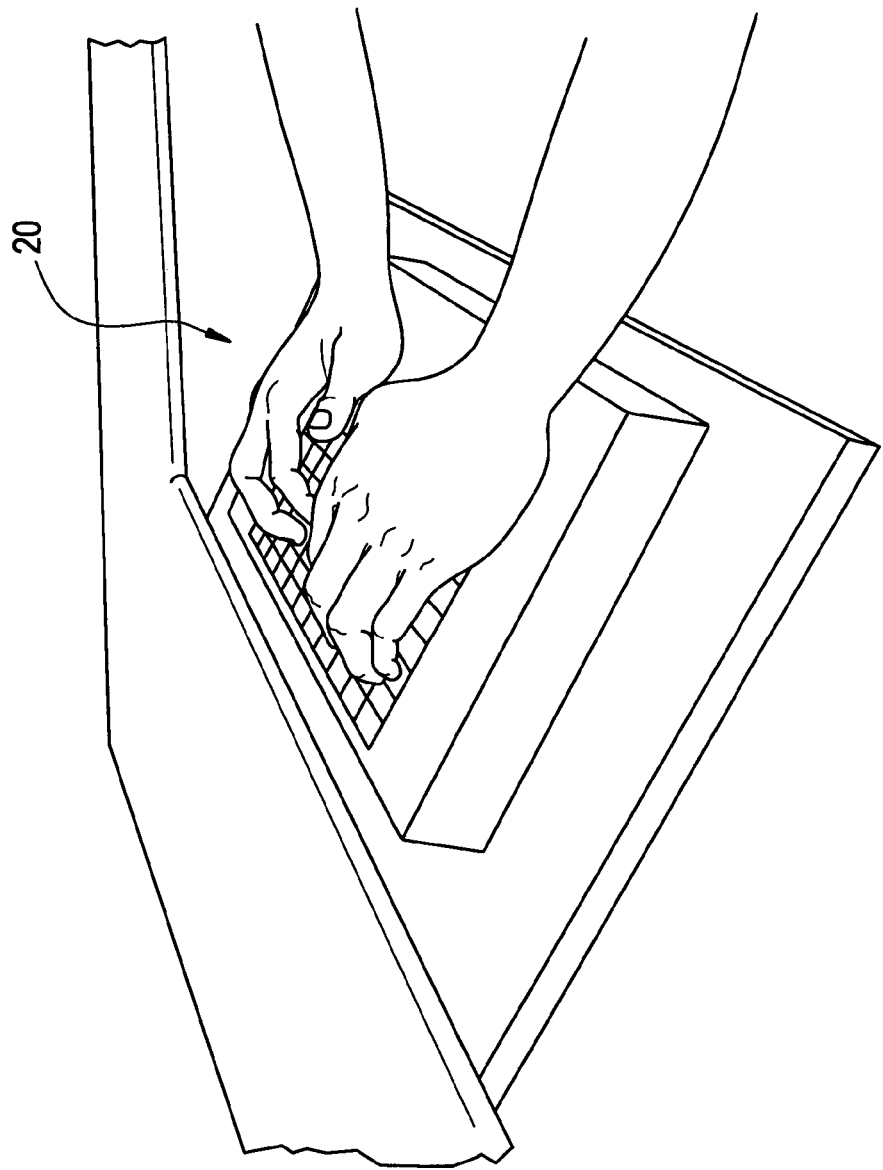
FIG. 2 is a perspective view of a keyboard in use in accordance with one embodiment of the present invention.

The keyboard 20 may be used as shown in the example depicted in FIG. 2. A user may position a portion of one or more fingers over one or more of the key areas 28 on the body 24 while resting a portion of a hand (e.g., wrist) on the compressible wrist support portion 36. The user then may depress one or more of the key areas 28.

Keyboards provided by the present invention, for example keyboard 20 shown in FIG. 1, may be made in the following exemplary manner. One or more pieces of compressible material are shaped to obtain a one-piece body as previously described with reference to FIG. 1. A key sensor is placed under each of the key areas, and a symbol is then placed on each of the key areas. Such a method may also include configuring a sensory feedback section of the keyboard to respond to key sensors under the key areas. A proximal edge of the body may be selectively shaped, for example, as desired by a particular user.

Where, for example, the key symbols are stenciled onto the keyboard 20, no covering or wrapping of the keyboard 20 is required. A one-piece keyboard of the present invention provides superior wrist support when compared to conventional keyboards. A single piece of material having an overall spring constant matched to, or appropriate for, a particular user may be used to fabricate a custom-made keyboard for the particular user. In yet another configuration, varying degrees of resiliency may be provided in various portions of the keyboard 20, by joining together pieces of compressible material having appropriate densities/spring constants. Finger force specifications can be met by selecting an appropriate material density, instead of resorting to expensive and complicated mechanical configurations. Multiple material densities may be selected by a manufacturer to inexpensively fabricate and offer a selection of keyboards. A user/purchaser could, for example, choose a keyboard classified as, or made from, "soft", "medium" and/or "firm" compressible materials. Similarly, a user may select a softer material for the key areas but a firmer material for the wrist support areas.

The one-piece keyboards of the present invention provide users with the use of a number of possible hand or wrist positions when using the keyboard.

The compressible material may be made of a lightweight material, making keyboards provided by the present invention portable and capable of being rolled up and/or compressed for transport. The simplicity of the above described keyboard makes it very cost-effective to manufacture.

The above has set forth some examples of the present invention. The true scope of the present invention, however, is better defined by the claims which follow.

What is claimed is:

1. A one-piece keyboard comprising:
   a compressible one-piece body having a uniform thickness over an entire area thereof, the compressible body including a plurality of depressible key areas, each depressible key area associated with a first spring constant and the plurality of depressible key areas forming a keypad having a substantially uniform thickness substantially equal to the thickness of the compressible one-piece body, and an integral wrist support area of the body associated with a second spring constant.

2. The keyboard of claim 1, wherein the first and second spring constants are substantially the same.

3. The keyboard of claim 1, wherein the body comprises a compressible foam.

4. The keyboard of claim 1, wherein the body comprises at least one of a compressible foam, foam-like material, synthetic rubber, or a rubber-like material.

5. The keyboard of claim 1, wherein each key area is operable to transmit a signal when the key area is sufficiently depressed.

6. The keyboard of claim 1, further comprising a sensory feedback section selectively operable to output a signal in response to a force on one or more of the key areas.

7. The keyboard of claim 1, wherein each key area comprises a surface having a symbol indicated thereon.

8. The keyboard of claim 1, further comprising a plurality of key sensors situated in the body, wherein at least one of the key sensors is located beneath one of the key areas.

9. The keyboard of claim 1, wherein the wrist support area comprises a compressible proximal edge.

10. The keyboard of claim 1, wherein the body is sized to enable a user to rest one or both hands on the keyboard.

11. A method of using a one-piece keyboard comprising: positioning a portion of one or more fingers over a plurality of depressible key areas, each depressible key area associated with a first spring constant of a compressible one-piece body having a uniform thickness over an entire area thereof, the plurality of depressible key areas forming a keypad having a substantially substantially equal to the thickness of the compressible one-piece body uniform thickness, while resting a portion of a hand on a compressible wrist support area of the body associated with a second spring constant of a compressible material; and depressing one or more of the key areas.

12. The method as in claim 11, wherein the first and second spring constants are substantially the same.

13. The method as in claim 11, further comprising selectively enabling a sensory feedback section of the keyboard.

14. The method as in claim 11, further comprising selectively disabling a sensory feedback section of the keyboard.

* * * * *

UNITED STATES PATENT AND TRADEMARK OFFICE
CERTIFICATE OF CORRECTION

PATENT NO. : 7,325,988 B2 Page 1 of 1
APPLICATION NO. : 10/878540
DATED : February 5, 2008
INVENTOR(S) : Philip T. Kortum It is certified that error appears in the above-identified patent and that said Letters Patent is hereby corrected as shown below:

Col. 5, line 10: replace "substantially" with -- uniform thickness --.
Col. 5, line 11: delete -- uniform thickness --.

Signed and Sealed this

Twentieth Day of May, 2008

JON W. DUDAS
*Director of the United States Patent and Trademark Office*